3,387,506
AUTOMATIC GEARBOX WITH CONVERTER
Jean G. Cadiou, Paris, France, assignor to Societe
   Anonyme Andre Citroen, Paris, France
Filed Aug. 3, 1965, Ser. No. 476,854
Claims priority, application France, Aug. 7, 1964,
   984,498
6 Claims. (Cl. 74—732)

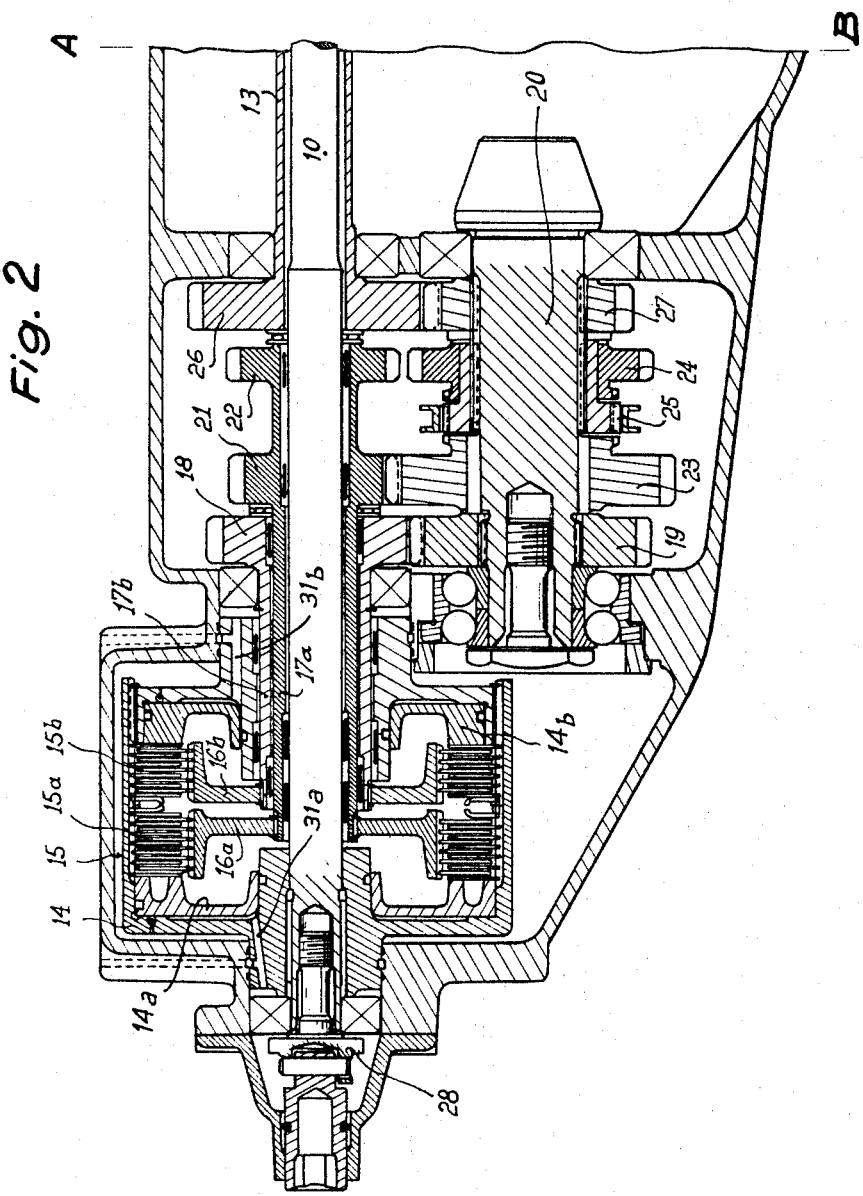

ABSTRACT OF THE DISCLOSURE

An automatic gearbox with a hydraulic converter including two shafts disposed concentrically, one within the other and within the hydraulic converter. One of the shafts is capable of being selectively coupled by the aid of a first clutch means to the turbine member of the converter while the other ends of both shafts extend into the interior of a gear train housing where the shaft associated with the clutch is rigidly secured to a gear of a train. The other of the shafts is permanently coupled by one of its ends to the turbine member of the converter while at its opposite end it is provided with at least one other clutch means capable of entraining selectively at least one gear train of the gearbox by the intermediary of at least one sleeve mounted concentrically on the other shaft.

---

Figure 1:
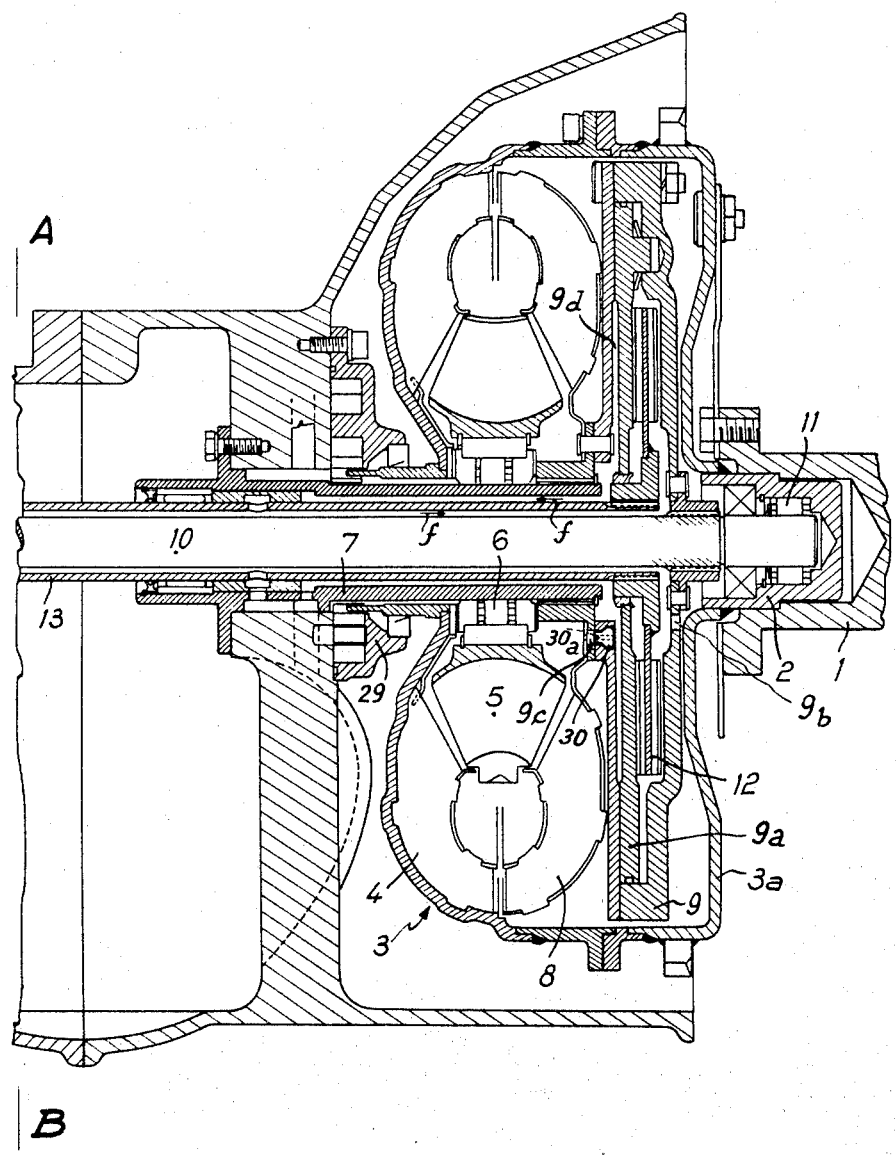

Various types of automatic gearboxes are already known wherein the output shaft of a converter driven by the drive shaft is in mesh with reduction gear trains through the medium of selection clutches. In gearboxes of this kind, it is however difficult conveniently to arrange the various parts, particularly on account of the multiplicity of selection clutches which have to be grouped near the reduction gear trains. Moreover, the engine braking effect, in other words, the driving of the engine by the wheels, is always effected through the medium of the converter, which may have various disadvantages at low speeds and especially at high reduction ratios of the reduction gear trains.

The invention has for an object an automatic gearbox with hydraulic converter intended particularly for motor vehicles and obviating the disadvantages which have just been mentioned, while having also at the same time various advantages.

According to the invention, the gearbox comprises two shafts driven by the "turbine member" of the converter. One of said shafts, which is keyed directly on said turbine member, is connected to the driving member of a first clutch which is adapted to drive, on the driven side, at least two reduction gear trains, preferably those of high reductions and the reverse. The other shaft, on the contrary, which is preferably hollow and coaxial with the first, constitutes the driven member of a second clutch, the driving member of which is secured to the first shaft, said other shaft being locked if desired through the medium of selection members, to at least a third train of reduction gears. In an advantageous alternative version of the invention, there is provided a first clutch, the driven member of which is in its turn adapted to drive selectively at least two gear trains.

In accordance with these arrangements, the clutch connected to the turbine member can be located on the other side of the converter with respect to the other clutches, although the two output shafts are generally situated on the same side of the converter, in other words, on the side where the reduction trains are situated. The torque is transmitted by the converter to the driven shaft, through the medium of one or other of the two output shafts, depending on the reduction ratio selected. Generally, there will be provided only one reduction gear train driven by the shaft connected to the turbine member of the converter through the medium of a clutch. Nevertheless, it is obviously possible to provide more than one reduction gear train driven by said shaft and locked on the output shaft of the gearbox through the medium of conventional selection members.

In order that the invention may be more clearly understood, reference will now be made to the accompanying drawings, in which:

FIGURE 1 and FIGURE 2 illustrate in axial section the assembly of a gearbox according to the invention, intended for a vehicle, said two figures joining one another along the line A–B.

Referring now to the drawings, and more especially to FIGURE 1, it will be seen that a drive shaft 1 is engaged over a ferrule 2 which is rigidly secured to a casing $3_a$ of a converter unit designated by the general reference 3, said casing supporting a blade assembly 4 of the pump member of the converter unit. A reaction blade assembly 5 of a conventional type is mounted through the medium of a freewheel 6 on a sleeve 7 coaxial with the drive shaft and fixed to the frame of the gearbox. The pump member 4 as well as the turbine member 8 of the converter are mounted for free rotation on the sleeve 7, the turbine member being however rigidly secured to a hollow disc 9 keyed for rotation by means of splines, for example on a shaft 10 coaxial with the sleeve 7, the ferrule 2 and the drive shaft 1.

Between a shaft 10 and the ferrule 2 there is mounted a freewheel 11, the purpose of which will be apparent hereafter. It should however be noted at this point that this freewheel is mounted in such a manner that it only permits the transmission of torques coming from the shaft 10 towards the drive shaft in the normal direction of rotation of said two shafts.

Inside the hollow disc 9, which is rigidly secured to the turbine member of the converter, there is disposed a clutch plate 12 keyed for rotation on a hollow shaft 13 extending axially between the shaft 10 and the sleeve 7 and extending beyond the latter. The clutch plate 12 is however mounted to slide with respect to the shaft 13 and a plate 9a axially movable, but associated in rotation with the disc 9, enables it to be made integral in rotation with the hollow disc 9 and, consequently, with the turbine member of the converter. For this reason, the plate 9a constitutes the piston of a hydraulic jack, the cylinder of which is the hollow disc 9 itself. It is possible at this point to indicate that it will be advantageous to operate the movable plate 9a by the fluid under pressure delivered by the circulation and cooling pump of the converter. In fact, as will be described hereafter, the clutch 12 will be used at the moment when the converter functions practically as a coupler, in other words in conditions such that there is practically no longer any need for cooling. There is therefore provided a distributor (not illustrated) making it possible to reverse the direction of circulation of the fluid delivered by the pump 29. At low speeds, the fluid follows the path indicated by the arrows f by passing through apertures 9b and 9c provided in the two faces of the hollow disc 9. The apertures 9c situated in the chamber in which the plate 9a rotates are, however, provided with a non-return valve 30 practically preventing the fluid from passing from the inside of the hollow disc towards the converter. An aperture 30a of very small size is however provided in the valve 30 in order to keep the converter under pressure. When the direction of circulation is reversed, the fluid is forced at high pressure into the chamber 9d and pushes back the plate 9a which secures the plate 12 to the hollow disc 9.

If reference is now made to FIGURE 2, it is seen that the shaft 10, which is keyed directly on the turbine member of the converter, is integral in rotation with the outer frame 14 of a disc clutch designated by the general reference 15. In the example illustrated, said clutch comprises two groups of discs 15a and 15b adapted to cooperate with the friction discs mounted on two plates 16a and 16b, respectively keyed for rotation on two hollow shafts 17a and 17b coaxial with the shaft 10. Operating pistons 14a and 14b, actuated selectively by a fluid under pressure circulating in the passages 31a and 31b, make it possible to apply respectively the discs of the plate 16a on the discs 15a and the discs of the plate 16b on the discs 15b, said various discs being mounted slidably in relation to their respective supports.

The shaft 17b carried a pinion 18 in mesh with a pinion 19 keyed on the output shaft 20 of the gearbox. The shaft 17a carries in its turn two pinions 21 and 22, the pinion 21 being constantly in mesh with a pinion 23 mounted for free rotation coaxially with the shaft 20. The pinion 22 in its turn is keyed for rotation through the medium of an intermediate pinion (not illustrated) with the pinion 24 which is mounted for free rotation on the shaft 20. The pinions 23 and 24 are, moreover, provided with dogs adapted to be in mesh with the corresponding dogs of a sliding member 25 keyed for rotation on the shaft 20, but sliding axially with respect to the latter. The pinions 22 and 24, as well as the intermediate pinion linking them, make it possible to rotate the shaft 20 in reverse, whereas the pinions 21 and 23 correspond to "first gear"; the pinions 18 and 19 correspond in their turn to the "second gear." In other words, the assembly of reduction gear trains driven by the shaft 10 corresponds preferably to the lowest speeds of the shaft 20, that is, to the highest reductions.

Furthermore, the shaft 13 is rigidly secured at its extreme left, that is, on the opposite side to the clutch 9–12 with respect to the converter, to a pinion 26 constantly in mesh with the pinion 27 which is keyed in rotation on the shaft 20. This reduction gear train corresponds preferably to the "third gear" or in a more general manner to the lowest reductions.

As has already been mentioned, there might be provided two or more reduction gear trains similar to the gear train 26–27, each of said trains being adapted to be in mesh with the shaft 20 through the medium of suitable selection members.

Finally, the extreme left of the shaft 10, which in the case of a gearbox intended to equip a motor vehicle may be the end accessible from outside, is provided with a drive means 28 with catches making it possible to communicate to the shaft 10 a rotational torque in the normal direction of rotation of said shaft.

The operation of the gearbox is therefore as follows: the drive shaft driving the pump member of the converter, the latter causes the rotation of the turbine member to which is connected the shaft 10. When the "first gear" engagement control is operated, the sliding member 25 comes into engagement with the pinion 23 and the discs of the plate 16a engage with the discs 15a. The movement of the shaft 10 is then communicated to the gearbox output shaft 20. The engagement of the discs of the plate 16b with the discs 15b is then effected in a conventional manner, which causes the simultaneous disengagement of the discs of the plate 16a and the discs 15a. The movement of the shaft 10 is then transmitted to the shaft 20 through the medium of the reduction gear train 18–19.

In each of these phases of operation, as also in the case when the sliding member 25 is engaged on the dogs of pinion 24, the torque is transmitted through the medium of the converter, of which the "pump" and "turbine" members have a certain amount of slip. If for any reason the torque is rednuced, the shaft 10 tending to rotate faster than the drive shaft 1, the freewheel 11 comes into action and secures the shaft 10 in rotational association with the drive shaft. There is thus arranged an "engine braking effect" which is very effective since the converter is then by-passed.

If the engagement of the plate 12 with the disc 9 is now effected, said disc being associated with the turbine member of the converter by reversal of the direction of circulation of the fluid delivered by the pump 29, and if simultaneously the disengagement is caused of the discs of the plate 16b and the discs 15b, the torque is transmitted to the shaft 20 through the medium of the clutch 9–12, the shaft 13 and the gear train 26–27. In this phase of operation, which corresponds to the normal operation of a vehicle on a road, the converter unit fulfils its normal function of a vibration filter, the "engine braking effect" then acting through its agency.

Finally, it should be mentioned that when the drive shaft is at rest, it can be rotated by hand by means of the drive means with catches 28 which is rigidly secured to the shaft 10, which in its turn is in mesh with the drive shaft through the medium of the freewheel 11.

Obviously, the invention is not limited to the embodiment which has just been described, but covers on the contrary all its alternative versions; in particular, the controls of the various clutches may be of a conventional type or of any other suitable type, the control of the clutch 12–9 being preferably effected, as has already been stated, by the action of fluid under pressure delivered by the cooling pump of the converter which then functions practically as a coupler.

I claim:
1. In combination, an automatic gearbox and a hydraulic converter having a pump member and a turbine member; including first and second shafts disposed concentrically, one within the other and within said hydraulic converter; a first clutch means connected to said first shaft and capable of selectively coupling one end of said first shaft to said turbine member of said hydraulic converter to rotate therewith; said second shaft being rigidly fixed at one end to said turbine member of said hydraulic converter; a gear train housing separate from said hydraulic converter and into which the other ends of said first and second shafts extend; said first shaft having the pinion of a first gear train formed integrally therewith at said other end; a sleeve concentric with the second shaft and having clutch means slidably mounted thereon and at least one other clutch means slidably coacting with said sleeve clutch means to selectively couple said second shaft with at least one other gear train within said gearbox housing.

2. The combination defined in claim 1 wherein said second shaft is solid and is disposed within said first shaft.

3. The combination defined in claim 1 wherein said other clutch is remote from the hydraulic converter and is separated therefrom by the housing containing said gear trains.

4. The combination defined in claim 3 in which there are two sleeves and both clutches are remote from said hydraulic converter and each being keyed to said sleeves, the sleeves being disposed concentrically one within the other and concentric to and of larger diameter than said second shaft, each of said keyed sleeves having formed integrally therewith respective pinion gears coacting with gears mounted within said gear train housing.

5. The combination defined in claim 1 including a driveshaft adapted to be driven by a power source and a freewheel interposed between said driveshaft and said one end of said second shaft.

6. The combination defined in claim 1 wherein there are two other clutch means each of which cooperates with the sleeve means; one of said sleeve means having a single pinion gear formed therein while the other sleeve carries two pionion gears; said pinion gears being selectively coupled to drive respective gear trains upon actuation of said two other clutch means.

(References on following page)

References Cited

UNITED STATES PATENTS

| | | | |
|---|---|---|---|
| 3,235,043 | 2/1966 | Maurice et al. | 192—3.33 X |
| 3,307,429 | 3/1967 | Lynes | 74—731 |
| 2,950,630 | 8/1960 | Seidler | 74—732 X |
| 2,309,413 | 1/1943 | Neracher et al. | 74—732 |
| 2,321,672 | 6/1943 | Hall et al. | 74—330 |
| 2,400,093 | 5/1946 | Batten | 192—3.25 |
| 2,440,589 | 4/1948 | Kegresse | 74—330 |
| 2,512,856 | 6/1950 | Fisk | 74—730 X |
| 2,524,342 | 10/1950 | Descendre | 74—330 X |
| 2,529,400 | 11/1950 | Lapsley | 192—3.33 |
| 2,674,905 | 4/1954 | O'Brien | 74—730 |
| 2,992,713 | 7/1961 | Stump et al. | 192—3.33 |
| 2,995,950 | 8/1961 | Peras | 74—330 X |
| 3,238,726 | 3/1966 | Jandasek | 74—330 X |
| 3,175,411 | 3/1965 | McFarland | 74—330 X |

FOREIGN PATENTS 515,616  12/1952  Belgium.

DONLEY J. STOCKING, *Primary Examiner.*

J. R. BENEFIEL, *Assistant Examiner.*